July 2, 1968  W. C. MURR  3,390,572
SUSPENSION FOR TONOMETER PROBE
Filed April 16, 1965

INVENTOR.
WILLIAM C. MURR
BY Julian Caplan
ATTORNEY

United States Patent Office 3,390,572
Patented July 2, 1968

3,390,572
SUSPENSION FOR TONOMETER PROBE
William C. Murr, El Sobrante, Calif., assignor to Berkeley Tonometer Company, Berkeley, Calif.
Filed Apr. 16, 1965, Ser. No. 448,725
3 Claims. (Cl. 73—80)

ABSTRACT OF THE DISCLOSURE

An aplanation electronic tonometer probe suspension has a pair of rings within its casing, each secured to the periphery of a thin, perforated annular metal diaphragm. The tonometer probe is secured through the diaphragm apertures and is suspended thereby for longitudinal deflection. An annular web of a ring is parallel and in close proximity to the diaphragm to limit deflection thereof and reduce likelihood of damage.

This invention relates to a new and improved suspension for tonometer probe. More particularly, the present invention relates to a portion of an instrument used in tonometry which comprises an elongated casing having an annular nosepiece or tip which is manually applied to the eye and causes a flattening of an area of the surface thereof. Intraocular pressure resists flattening. Suspended inside the instrument and longitudinally slidable therein is a probe which is suspended in the opening of the nosepiece. The intraocular pressure causes an inward deflection of the probe relative to the nosepiece and the extent of such deflection is a measure of intraocular pressure. Within the instrument is a differential transformer having an armature which is fixed for movement with the probe. The transformer reading is amplified and recorded and the record is useful in diagnosis of eye disease, principally glaucoma.

An important feature of the instrument hereinafter described is the provision of means for suspension of the probe within the casing. More particularly, the suspension comprises a pair of flexible, thin metallic discs disposed transversely to the direction of movement of the probe and fixed thereto at their inner diameter and fixed to rings which are mounted in the casing at their outer diameters. The flexibility of the diaphragms is enhanced by etching or other means providing extreme flexibility to pressures exerted transverse to the plane of the diaphragm. This form of suspension has a number of important advantages, including the following:

The mounting of the probe relative to the casing and particularly relative to the annular tip or nosepiece through which the probe projects is very accurate, so that the probe is disposed centrally of the opening and does not rub against the nosepiece, nor is its longitudinal movement in any way inhibited. The suspension is accurate in a longitudinal sense so that the position of rest of the probe relative to the casing is constant.

A further feature of the mounting is its extreme sensitivity so that deflection of the probe is responsive to minute pressure differentials in the eye surface to which it is applied. Further, the extent of deflection of the probe is proportional to pressure differential within a wide range.

Another important advantage of the suspension is the fact that it is highly resistant to shock. It will be understood that instruments of this type are extremely sensitive. Heretofore, when an instrument was dropped, the usefulness of the instrument was destroyed until extensive repairs could be made, whereas the present instrument will stand considerable abuse.

A still further feature of the mounting is the fact that the probe is for practical purposes thermally insulated from the casing, transformer and other portions of the instrument. It will be understood that the thin diaphragms which are relieved by etching are very poor conductors of heat between the casing and transformer and the probe, thereby making the probe independent thermally of the rest of the instrument. The length of the probe and sensitivity of reading of the instrument are thus not affected by the temperature of the instrument.

Another important feature of the invention hereinafter described in detail is the provision of stops which prevent overtravel of the probe and hence prevent stresses being imparted to the diaphragm in excess of the ability of the diaphragm to withstand the same. Hence the probe is allowed to move within its ordinary limits of travel, but if an undue shock is imparted to the instrument the stops prevent damage.

A still further feature of the invention is that the mounting permits an integral assembly of probe, mounting rings and differential transformer which may be installed and removed relative to the casing as a unit.

Still another feature of the invention is the provision of ventilating means in the tip or nosepiece which prevents pneumatic pressures within interior of the casing from interfering with an accurate reading.

Other objects of the present invention will become apparent upon reading the following specification and referring to the accompanying drawings in which similar characters of reference represent corresponding parts in each of the several views.

Figure 1:
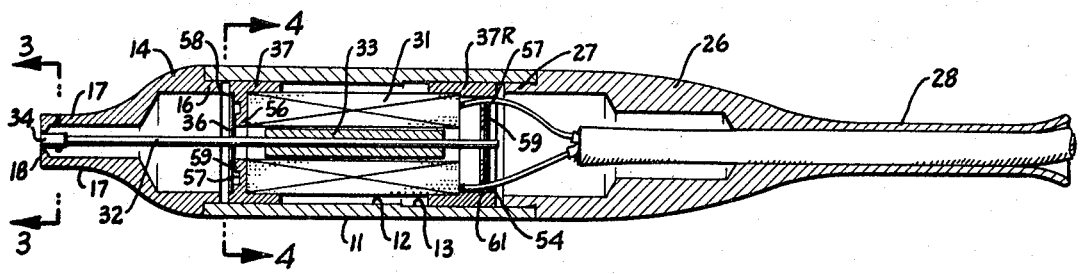
FIG. 1 is a longitudinal vertical mid-section through the instrument.
Figure 2:
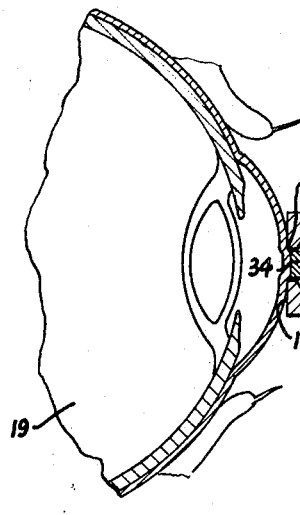
FIG. 2 is an enlarged schematic view showing the tip of the instrument applied to an eye.
Figures 3, 6:
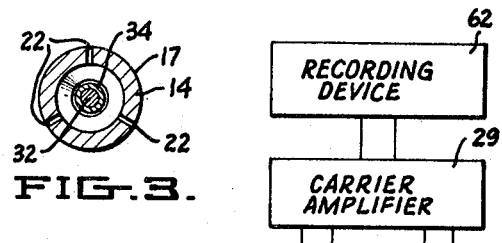
FIGS. 3 and 4 are sectional views taken along the lines of 3—3 and 4—4, respectively, of FIG. 1.
FIG. 6 is a schematic wiring diagram of the invention.

The main body 11 of the instrument is of hexagonal stock having circular forward bore 12 and slightly larger rearward bore 13. Body 11 is of a size and shape which is comfortably held in the hand and for practical purposes may be of 9/16 hexagonal stock with a length of approximately 1¼ inches. Attached to the forward end of body 11 is a forward nosepiece or tip having collar 16 which fits into forward bore 12 of body 11. Tip 14 is conical and terminates in an annular nosepiece 17 having a flat annular end 18 which is applied (as best shown in FIG. 2) against eye 19 to form a flat area 21 thereon. The interior of tip 14 is of restricted diameter adjacent end 18 and then widens out for the remainder of its length. Three radial holes 22 are formed in tip 17 for ventilation of the interior to prevent the building up of internal pneumatic pressures which would interfere with the reading of the instrument.

A rear shell 26, having collar 27 fitting into rear bore 13 has a rearwardly tapered hollow extension 28 which receives a portion of the instrument and also provides a guide for the rearward protruding wires which attach the instrument to amplifier 29.

Mounted within body 11 is a differential transformer 31 having an annular core. Reciprocating relative to transformer 31 is a probe 32 having an iron armature 33 electrically centered in transformer 31. The forward end of probe 32 is provided with a tip 34 which is slidable within the opening in nosepiece 17, is accurately centered therein but is not in contact therewith. The forward end of tip 34 is flat and, in the normal position of the probe, is coplanar with the end 18 of the nosepiece 17.

Figure 4:
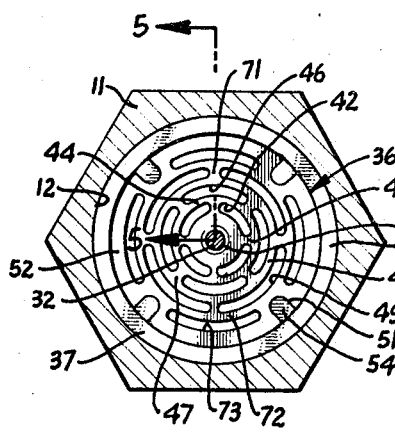
Figure 5:
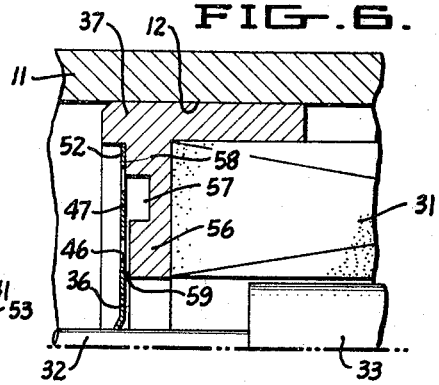
FIG. 5 is an enlarged fragmentary view taken substantially along the line 5—5 of FIG. 4.

An important feature of the present invention is the suspension of probe 32 relative to body 11 to accomplish the objects heretofore set forth. For such purpose, there is disposed adjacent either end of the body a suspension diaphragm 36. Such diaphragm 36 is annular and is preferably made of thin metal, such as sheet brass. The inside diameter of diaphragm 36 is soldered to probe 32 and the outside diameter is soldered to the inside diameter of a brass support ring 37 which fits inside body 11. Viewed in front elevation, as in FIG. 4, it will be seen that suspension diaphragm 36 is etched or otherwise relieved in a pattern which imparts considerable flexibility to the diaphragm when pressure is applied in a plane normal to its surface. Thus, proceeding outwardly from the center, there is a rather wide annular band 41 through which the probe extends and which is soldered to the probe. Outwardly of band 41 is a series of four arcuate first slots 42, the ends of which are defined by short first radial arms 43 which connect the inner band 41 to a narrow first thin ring 44. Outwardly of the first thin ring 44 are four arcuate second slots 46 which are staggered 45° from the first slots 42 and are defined by second radial arms 47 which connect the first thin band 44 to the second thin annular band 48. Proceeding outwardly of second band 48 are four additional third slots 49 which are staggered 45° relative to second slots 46 and are defined by third radial arms 71 which connect second band 48 to third band 72. Outwardly of the third thin band 72 are four arcuate fourth slots 73 angularly spaced 45° from third slots 49 and defined by U-shaped connectors 51 which extend in from the outer thick band 52 on the periphery of the diaphragm. Four equi-angularly spaced notches 54 define the U-shaped connectors 51 between outer band 52 and the outermost thin band 72, and are used in the rear support 37R only for passage of lead wires to the transformer 31. Accordingly, the diaphragms 36 suspend probe 32 relative to body 11 permitting longitudinal movement of probe 32 responsive to pressure at tip 34.

To prevent overtravel of probe 32, rings 37 provide stops 56 which are integral with rings 37 and are positioned inwardly of diaphragms 36 a fixed distance which limits the travel of the probe. The surface of stop 56 is parallel and spaced from diaphragm 36 and comprises an annular flange attached to ring 37. To improve the flexible mounting of diaphragm 36, an annular groove 57 is formed in the stop 56 adjacent its outer periphery and thus each ring mounting has an annular surface 58 against which diaphragm 36 fits and an inwardly stepped stop surface 59 which limits inward movement of diaphragm 36. Four holes 61 are drilled in rear ring 37R for passage of transformer lead wires, holes 61 being in registry with notches 54.

The transformer casing 31 is received in the ends of the rings 37, 37R and thus a sub-assembly is provided consisting of transformer 31, mounting rings 37, diaphragms 36 and probe 32 which may be installed in body 11 as a unit from the rear or larger diameter end. The front and back tips 14, 26 are then installed and the device is completely assembled.

In use, the nosepiece end 18 is pressed against the eye 19 and forms a flat area 21 thereof which is resisted by intraocular pressure. Such pressure depresses tip 34 relative to nosepiece 17 and causes a deflection of armature 33 within differential transformer 31 which is amplified by amplifier 29 and recorded by a recording device 62, as well understood in the tonometry art. The record is useful in diagnosis of glaucoma and other diseases.

It will be seen that flexible diaphragm 36 mounting heretofore described centrally locates tip 34 of probe 32 within the center hole of the nosepiece 17 with no rubbing contact to interfere with accurate reading, and that the tip 34 of probe 32 and front end 18 of nosepiece 17 are coplanar in position of rest. By reason of the flexible nature of diaphragms 36, the deflection of probe 32 is sensitive, being responsive to minute pressures in eye 19 and the extent of deflection is proportional to such pressures. At the same time, by reason of stops 59 and by reason of the construction of diaphragm 36, the instrument is quite resistant to shock and, further, the probe is thermally insulated from the casing.

The sub-assembly heretofore described makes for easy insertion and replacement of the sensitive portions of the instrument when required.

The provision of holes 22 in nosepiece 17 provides ventilation of tip 14 which prevents pneumatic pressures building up inside body 11 from interfering with the accuracy of the reading.

Although the foregoing invention has been described in some detail, by way of illustration and example for purposes of clarity of understanding, it is understood that certain changes and modifications may be practiced within the spirit of the invention and scope of the appended claims.

What is claimed is:

1. In a tonometer, a hollow casing, a forward tip at one end of said casing formed with an opening and a flat annular surface surrounding said opening and a rearward tip opposite said forward tip; a rod movable longitudinally within said casing having one end located at said opening within said annular surface, an armature on said rod within said casing, electrical sensing means within said casing around said armature for sensing deflection of said rod relative to said annular surface, and a pair of longitudinally spaced support means for said rod spaced inward of said tips and held fixed within said casing, each said support means formed with an axially-inwardly spaced, transverse, annular recess and an annular stop axially-inward of said annular recess, an annular suspension diaphragm within said recess, means securing said diaphragm at its outer periphery to said support means, means securing the inner diameter of said diaphragm to said rod, said diaphragm comprising a thin flat disc pierced in a series of slots to provide a series of narrow rings interconnected by short arms between slots to enhance flexibility of said diaphragm responsive to pressure in a direction normal to the surface of said diaphragm, the outer margin of said diaphragm seated against the bottom of said recess and normally spaced from said stop, said stop limiting deflection of said diaphragm in a longitudinal direction toward said stop, said support means arranged with said recesses and stops facing in opposite directions longitudinally of said rod, whereby said stops cooperate to limit rod movement in either longitudinal direction and said diaphragms support said rod for limited longitudinal movement while holding said rod centered relative to said casing.

2. The combination of claim 1, in which each said diaphragm is pierced in a series of radially spaced, arcuate concentric slots to provide a series of concentric rings interconnected by short radial arms between slots.

3. The combination of claim 2, in which successive radially spaced slots are angularly staggered.

References Cited

UNITED STATES PATENTS

| | | | |
|---|---|---|---|
| 2,754,435 | 7/1956 | Ongaro | 73—71.4 X |
| 2,767,973 | 10/1956 | Ter Veen et al. | 73—517 |
| 3,150,521 | 9/1964 | Macka et al. | 73—80 |
| 3,184,960 | 5/1965 | Murr et al. | 73—80 |
| 3,192,765 | 7/1965 | Keiper | 73—80 |
| 3,272,001 | 9/1966 | Adise | 73—80 |

RICHARD C. QUEISSER, *Primary Examiner.*

J. J. SMITH, C. I. McCLELLAND, *Assistant Examiners.*